US011240049B2

(12) United States Patent
Karri et al.

(10) Patent No.: US 11,240,049 B2
(45) Date of Patent: Feb. 1, 2022

(54) AUTOMATIC RECHARGING OF DATA QUOTA FOR SUCCESSFUL COMPLETION OF TRANSACTION

(71) Applicant: International Business Machines Corporation, Armonk, NY (US)

(72) Inventors: Venkata Vara Prasad Karri, Visakhapatnam (IN); Kamal Kiran Trood Yamala, Visakhapatnam (IN); Naga Srinivasa reddy Padala, Visakhapatnam (IN); Chandra Sekhar Kalyan Devulapalli, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 16/431,896

(22) Filed: Jun. 5, 2019

(65) Prior Publication Data
US 2020/0389331 A1    Dec. 10, 2020

(51) Int. Cl.
*H04L 12/14* (2006.01)
*G06Q 20/16* (2012.01)
(Continued)

(52) U.S. Cl.
CPC .............. *H04L 12/14* (2013.01); *G06Q 20/16* (2013.01); *H04L 47/745* (2013.01);
(Continued)

(58) Field of Classification Search
None
See application file for complete search history.

(56) References Cited

U.S. PATENT DOCUMENTS

| 9,712,404 B2 | 7/2017 | Ozaki et al. |
| 2006/0215628 A1 | 9/2006 | Olariu et al. |

(Continued)

FOREIGN PATENT DOCUMENTS

| CN | 106899521 A | 6/2017 |
| CN | 106992938 A | 7/2017 |
| CN | 107094082 A | 8/2017 |

OTHER PUBLICATIONS

Rolysent Paredes et al., "Allocating Bandwidth Based on Users' Web Usage Patterns for University Networks: A Hybrid Data Mining Approach", 12th CEBU Int'l Conference on Advances in Science, Engineering and Technology (ICASET-18) Jun. 14-15, 2018, 6 pages.

*Primary Examiner* — Kevin T Bates
*Assistant Examiner* — Emad Siddiqi
(74) *Attorney, Agent, or Firm* — Rob Bean; Edell, Shapiro & Finnan, L.L.C.

(57) ABSTRACT

A method, computing system, and computer program product are provided. A processor of a computer system estimates an amount of bandwidth to be used to complete a transaction based on a usage history. Responsive to determining that the amount of the estimated bandwidth to be used exceeds a predefined threshold of an amount of available bandwidth and to determining that an account has any offers for additional bandwidth at no additional cost, the amount of available bandwidth is automatically recharged using at least some of the any offers until either the any offers are exhausted or the estimated amount of the bandwidth to be used would be less than the predefined threshold. When the estimated amount of the bandwidth to be used continues to exceed the predefined threshold, the bandwidth (Continued)

is automatically recharged using an advanced amount of bandwidth to increase a likelihood that the transaction will complete successfully.

12 Claims, 9 Drawing Sheets

(51) Int. Cl.
  *H04L 12/911* (2013.01)
  *H04L 12/927* (2013.01)
  *H04L 12/923* (2013.01)
(52) U.S. Cl.
  CPC .......... *H04L 47/762* (2013.01); *H04L 47/781* (2013.01); *H04L 47/805* (2013.01); *H04L 47/823* (2013.01)

(56) References Cited

U.S. PATENT DOCUMENTS

| | | | | |
|---|---|---|---|---|
| 2007/0002897 | A1* | 1/2007 | Goshen | H04L 41/0893 370/468 |
| 2010/0169475 | A1* | 7/2010 | Woundy | H04L 41/0896 709/224 |
| 2011/0296052 | A1* | 12/2011 | Guo | H04L 45/00 709/240 |
| 2013/0275578 | A1* | 10/2013 | Williams | H04L 41/0896 709/224 |
| 2015/0312421 | A1 | 10/2015 | Leemet et al. | |
| 2018/0063019 | A1* | 3/2018 | Martin | H04L 47/781 |
| 2018/0219796 | A1* | 8/2018 | Fadle | H04L 47/801 |
| 2019/0182146 | A1* | 6/2019 | Skog | H04L 47/12 |

\* cited by examiner

AUTOMATIC RECHARGING OF DATA QUOTA FOR SUCCESSFUL COMPLETION OF TRANSACTION

BACKGROUND

1. Technical Field

Present invention embodiments relate to determining that a user's network data quota does not provide enough bandwidth for successful completion of a transaction and either automatically recharging the user's network data quota such that the transaction can be successfully completed or determine actions to take to increase a probability that the transaction can be successfully completed.

2. Discussion of the Related Art

Transactions within a computer network typically involve data transfers. One example of a transaction includes, but is not limited to, a data transfer of payment information for a payment transaction. Worldwide, on average, a failure rate for payment transactions is more than 10%. There are several reasons why transactions via a computer network may fail. For example, if a user's computer network account has a data quota, an attempt by the user to perform a transaction via the computer network may completely use any remaining portion of the data quota, thereby causing a failed transaction due to a loss of bandwidth. The probability that a transaction will fail is especially high when the user's computer network account is simultaneously being used for parallel downloads while also being used to perform a transaction.

SUMMARY

A method, system, and computer program product are provided for decreasing a failure rate of online transactions. One or more processors of a computer system estimate an amount of bandwidth to be used to complete a transaction based on a usage history. In response to determining that the amount of the estimated bandwidth to be used exceeds a predefined threshold of an amount of available bandwidth and determining that an account has any offers for additional bandwidth at no additional cost, the one or more processors automatically recharges the amount of available bandwidth by using at least some of the any offers until either all of the any offers are exhausted or the estimated amount of the bandwidth to be used would be less than the predefined threshold of the amount of available bandwidth after the automatically recharging. When the estimated amount of the bandwidth to be used continues to exceed the predefined threshold, the one or more processors automatically recharge the bandwidth using an advanced amount of bandwidth to increase a likelihood that the transaction will complete successfully.

BRIEF DESCRIPTION OF THE DRAWINGS

Generally, like reference numerals in the various figures are utilized to designate like components.

DETAILED DESCRIPTION

A method, a system, and a computer program product are provided for reducing a failure rate of transactions via a computer network to allow for effective transfer of data through the computer network. A server connected to the computer network may monitor transactions occurring over the computer network on a per network server (NSP) account basis. The server may be trained to determine a type of the transaction and a type of the computer network on which the transaction is to be performed. Based on the determined type of the transaction, the determined type of the computer network, or both the determined type of the transaction and the determined type of the computer network, the server may determine, or assign, a priority to the transaction. In some embodiments, classifiers executing on the server to determine the type of the computer network and/or the type of the transaction may be trained for each NSP account such that computer networks and/or transactions for different NSP accounts may not be classified as being of a same type. In other embodiments, the classifiers executing on the server may trained such that all NSP accounts classify the type of computer network and/or the type of the transaction in a same manner.

It should be noted that, in the various embodiments, a NSP account may be an account associated with one or more individual users or with an enterprise for network services from a network service provider.

In one embodiment, the server may receive transaction information from a computer originating the transaction. The transaction information may include, but not be limited to, NSP account information for use of a computer network via a network service provider and a network address of a destination computing device on which the transaction is to be performed. Based on the transaction information, the server may estimate an amount of bandwidth to be used to complete a transaction associated with the transaction information. The server may determine an amount of bandwidth available for use by the NSP account before reaching a data quota and may further determine whether the estimated amount of bandwidth to be used exceeds a predefined threshold of the amount of bandwidth available for use. For example, if the predefined threshold is 95%, then the server may determine whether the estimated amount of bandwidth to be used exceeds 95% of the amount of bandwidth available to for use for the network service provider (NSP) account. In various embodiments, the predefined threshold may be set to 90%, 95%, 100%, or another value.

If the estimated amount of bandwidth to be used exceeds the predefined threshold of the amount of bandwidth available for use, then the server may determine whether the NSP account has any offers for additional bandwidth, at no additional cost, such that the data quota for the NSP account may be increased, at least temporarily. The additional bandwidth may be provided based on an unused amount of data remaining on the NSP account from a previous time period, or billing cycle, or may be provided from other sources for other reasons. If the NSP account is determined to have such offers, at least some of the offers may be used to automatically recharge the amount of bandwidth available by increasing the data quota, at least temporarily, for the NSP account. An amount of the offers used for automatically recharging may be either all of the offers or enough of the offers such that the estimated amount of the bandwidth to be used would be less than the predefined threshold of the amount of bandwidth available after the automatically recharging.

If the estimated amount of the bandwidth to be used continues to exceed the predefined threshold of the amount of bandwidth available to the NSP account, then the server may automatically recharge the bandwidth available to the NSP account using an amount of bandwidth advanced to the NSP account by, for example, a network service provider such that, after the automatically recharging, the estimated amount of the bandwidth to be used does not exceed the predefined threshold of the amount of bandwidth available for use. The advanced amount of bandwidth may be charged to the NSP account at a later time such as, for example, a next billing cycle or a different point in time.

In variations of the above embodiment, the automatic recharging based on no additional cost offers and the automatic recharging based on an advanced amount of bandwidth may be performed only for transactions exceeding a threshold level of priority, wherein the priority may be based on a type of the transaction, a type of the network on which a computing device for performing the transaction is connected, or both the type of the transaction and the type of the network on which the computing device for performing the transaction is connected. In such variations of the above embodiment, when the automatic recharging is not performed due to the determined priority not exceeding the threshold level of priority, then the server may suggest one or more actions to take to increase a likelihood that the transaction will be successfully completed. This will be discussed in more detail below.

Figure 1:
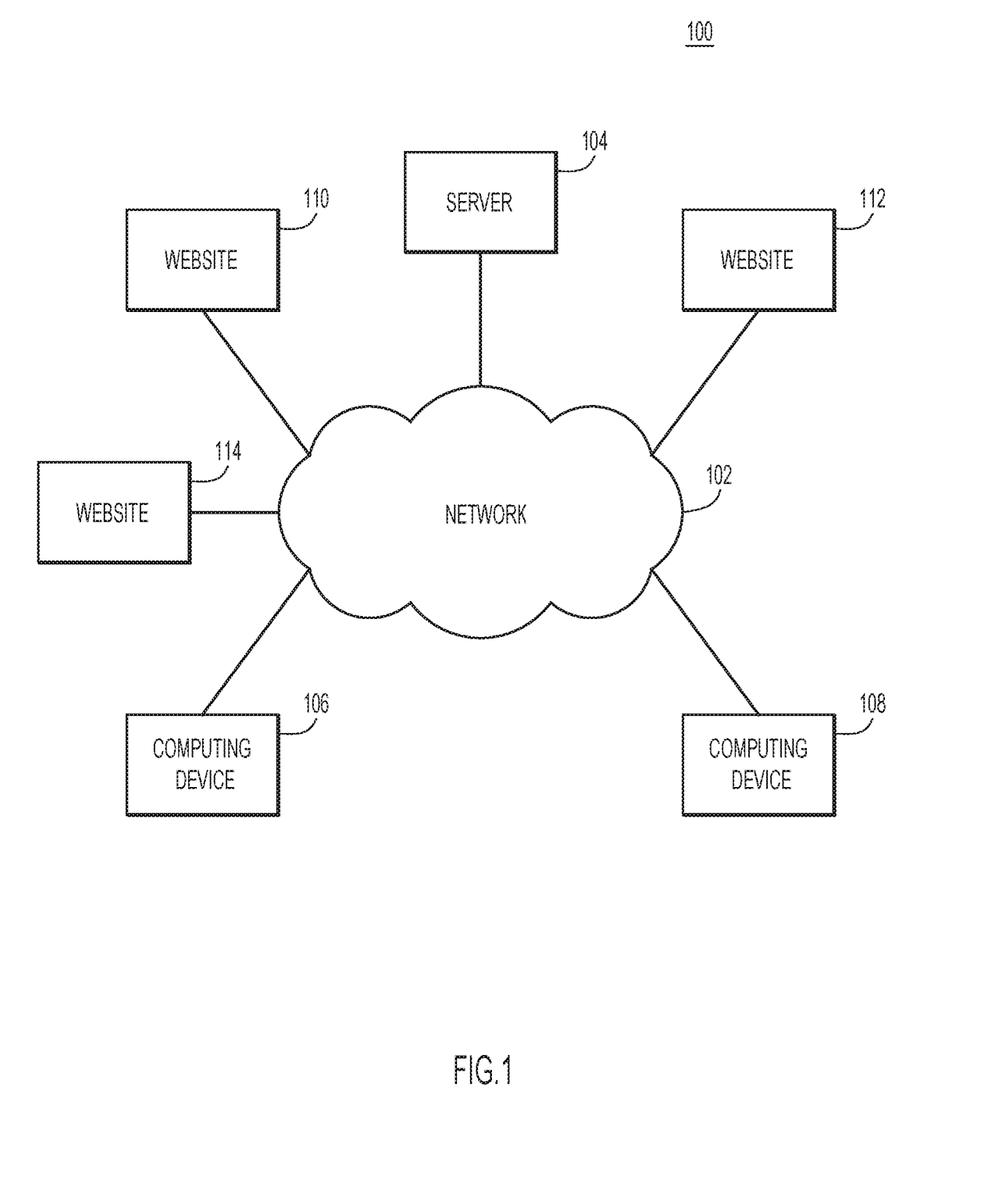
FIG. 1 illustrates an example environment in which various embodiments may operate.

FIG. 1 illustrates an example environment 100 in which the present invention embodiments may operate. Environment 100 may include a network 102, a server 104, computing devices 106, 108, and websites 110, 112, 114. Computing devices 106, 108 and server 104 may be connected to network 102 via a wired or wireless connection.

Network 102 may be implemented by any number of any suitable communications media (e.g., wide area network (WAN), local area network (LAN), Internet, Intranet, etc.) or any combination thereof. In some embodiments, network 102 may include a network in a cloud.

Computing devices 106, 108 and server 104 may communicate with each other via network 102. In this specification, a reference to server 104 can be interpreted as referring to either a single server or multiple servers in a server farm.

Server 104, computing devices 106, 108, and websites 110, 112, 114 may be implemented by any conventional or other computer system.

Although environment 100 of FIG. 1 shows two computing devices 106, 108, one server 104, and three websites 110, 112, 114, other environments may include different numbers of computing devices 106, 108, servers 106 and websites 110, 112, 114.

Figure 2:
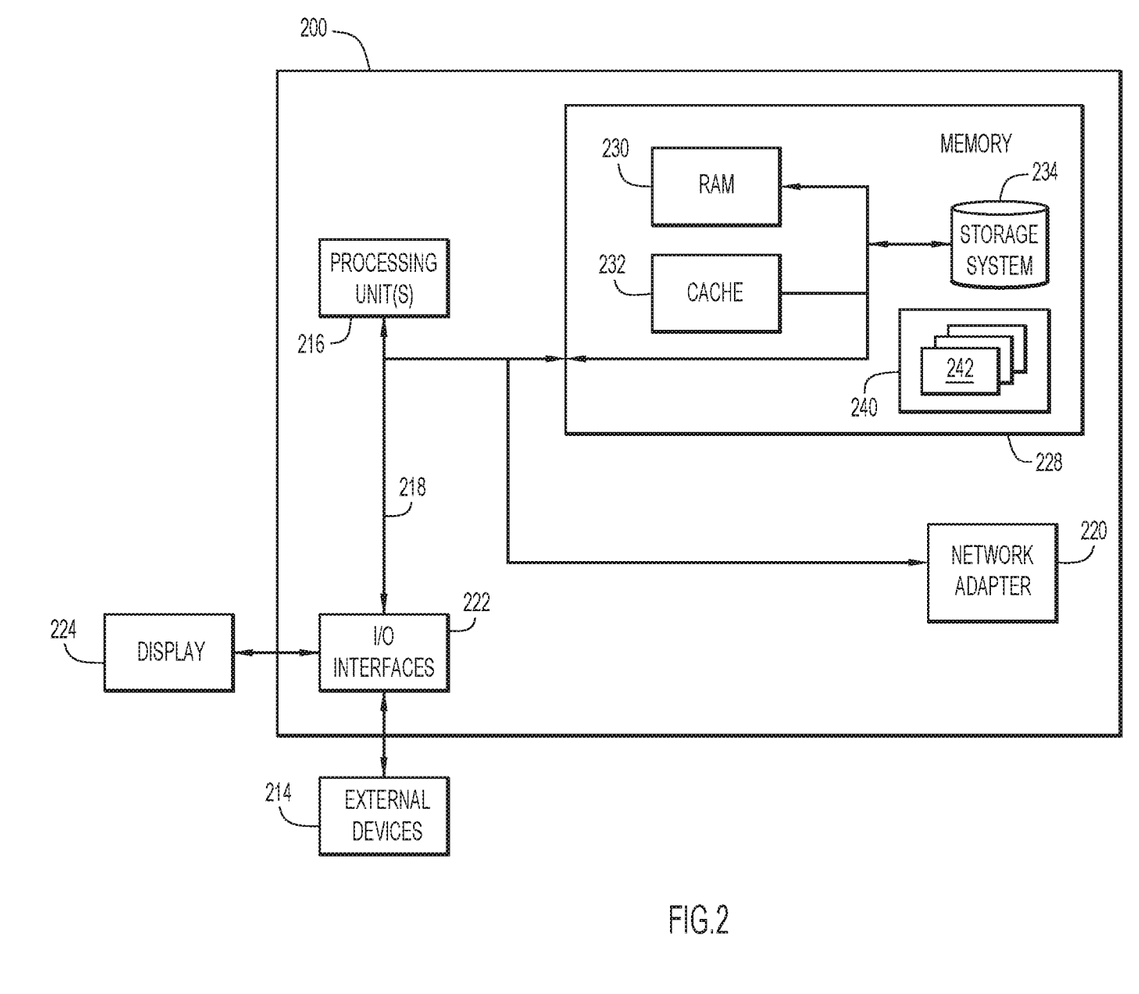
FIG. 2 is a functional block diagram of a general purpose computer that may implement a server or computing devices according to the various embodiments.

Referring now to FIG. 2, a schematic of an example computer system 200 is shown, which may implement any of server 104, computing devices 106, 108, and websites 110, 112, 114 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
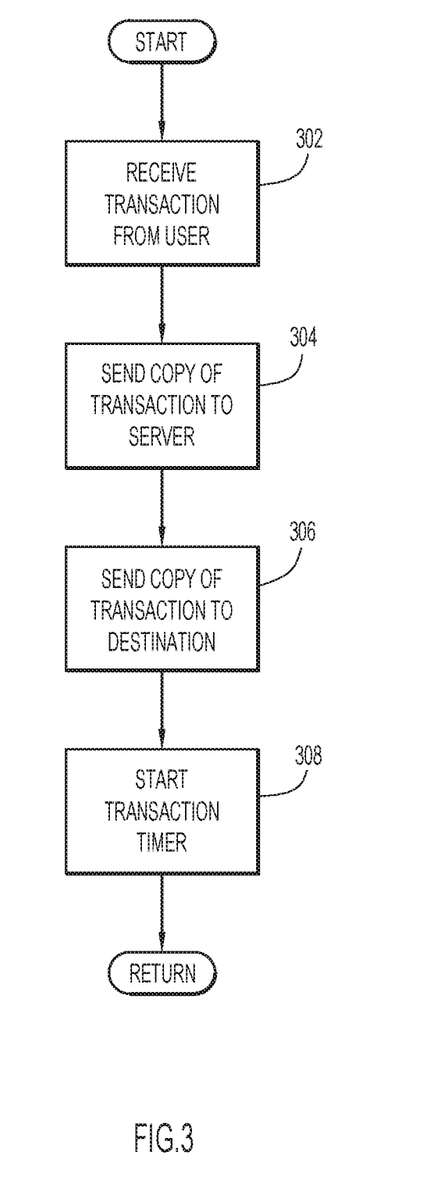
FIG. 3 is a flowchart that explains an example process that may be performed by a computing device, according to the various embodiments, upon receiving a transaction from a user.

FIG. 3 is a flowchart illustrating an example process that may be performed by any of computing device 106, 108 of a user. For the sake of simplifying this description, a reference to computing device 106 could apply, instead, to computing device 108 or another computing device. The process may begin with computing device 106 receiving a transaction originating from a user via use of, for example, a browser or application executing on computing device 106 (act 302). Computing device 106 then may send transaction information to server 104 (act 304). The transaction information may include, but not be limited to, NSP account identifying information such as, for example, a user ID, to identify a NSP account associated with the transaction, a destination network address for the transaction in order to identify a network on which the transaction is to be performed, and other information for identifying a type of the transaction. Computing device 106 may then send the transaction to the destination network address (act 306) and may start a transaction timer (act 308).

Figure 4:
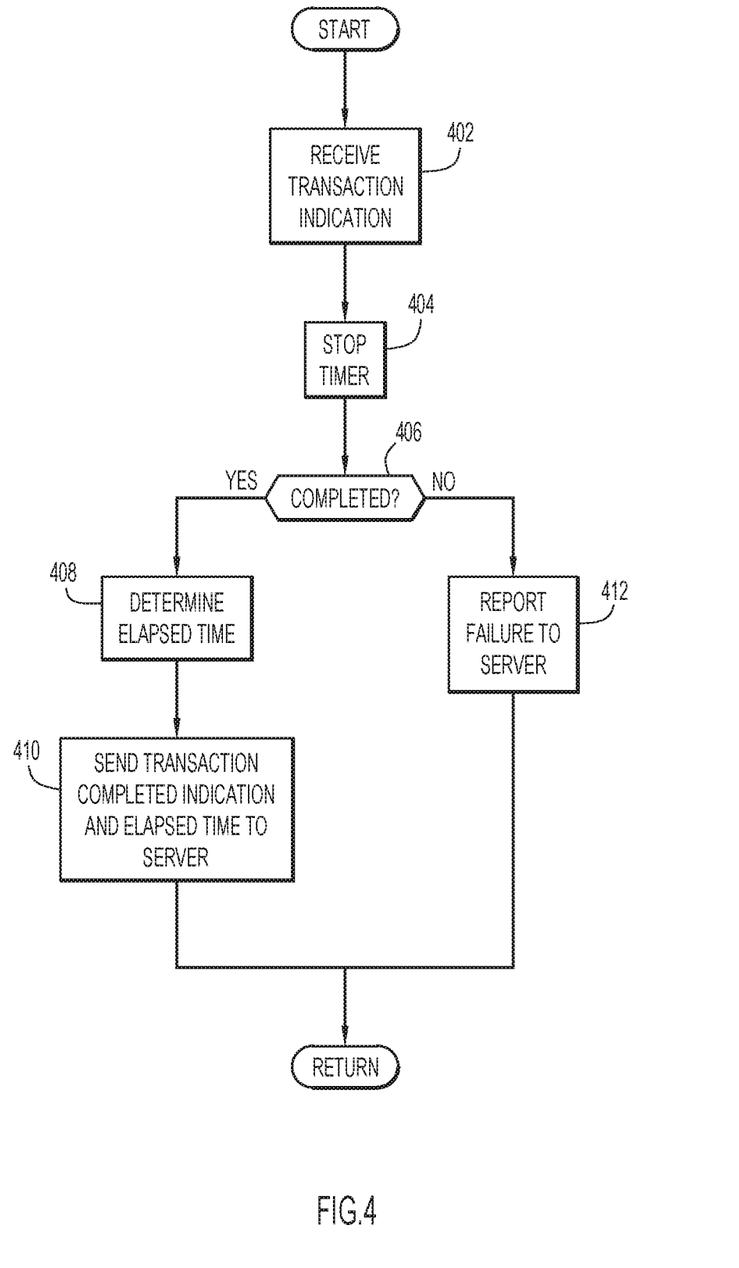
FIG. 4 is a flowchart of an example process, according to the various embodiments, that may be performed by a computing device upon receiving a transaction indication indicating that a transaction completed or failed.

FIG. 4 is a flowchart illustrating an example process that may be performed by computing device 106 when receiving a transaction indication from a computing device at the destination network address. The transaction indication may indicate that the transaction sent to the destination network address had either successfully completed or failed to complete.

The process may begin with computing device 106 receiving the transaction indication from the computing device upon which the transaction was performed (act 402). Computing device 106 may then stop the transaction timer (act 404). Computing device 106 may then determine whether the transaction indication indicates that the transaction was successfully completed (act 406).

If, during act 406, computing device 106 determined that the transaction indication indicates that the transaction was successfully completed, then computing device 106 may determine an amount of elapsed time from the transaction timer (act 408) and may send a transaction completed indication including the amount of elapsed time to server 104 such that server 104 may keep track of successfully completed transactions and an amount of time for performing these transactions (act 410).

If, during act 406, computing device 106 determines that the transaction indication indicated that the transaction failed to successfully complete, then the computing device 106 may report the transaction failure to server 104 (act 412).

Figure 5:
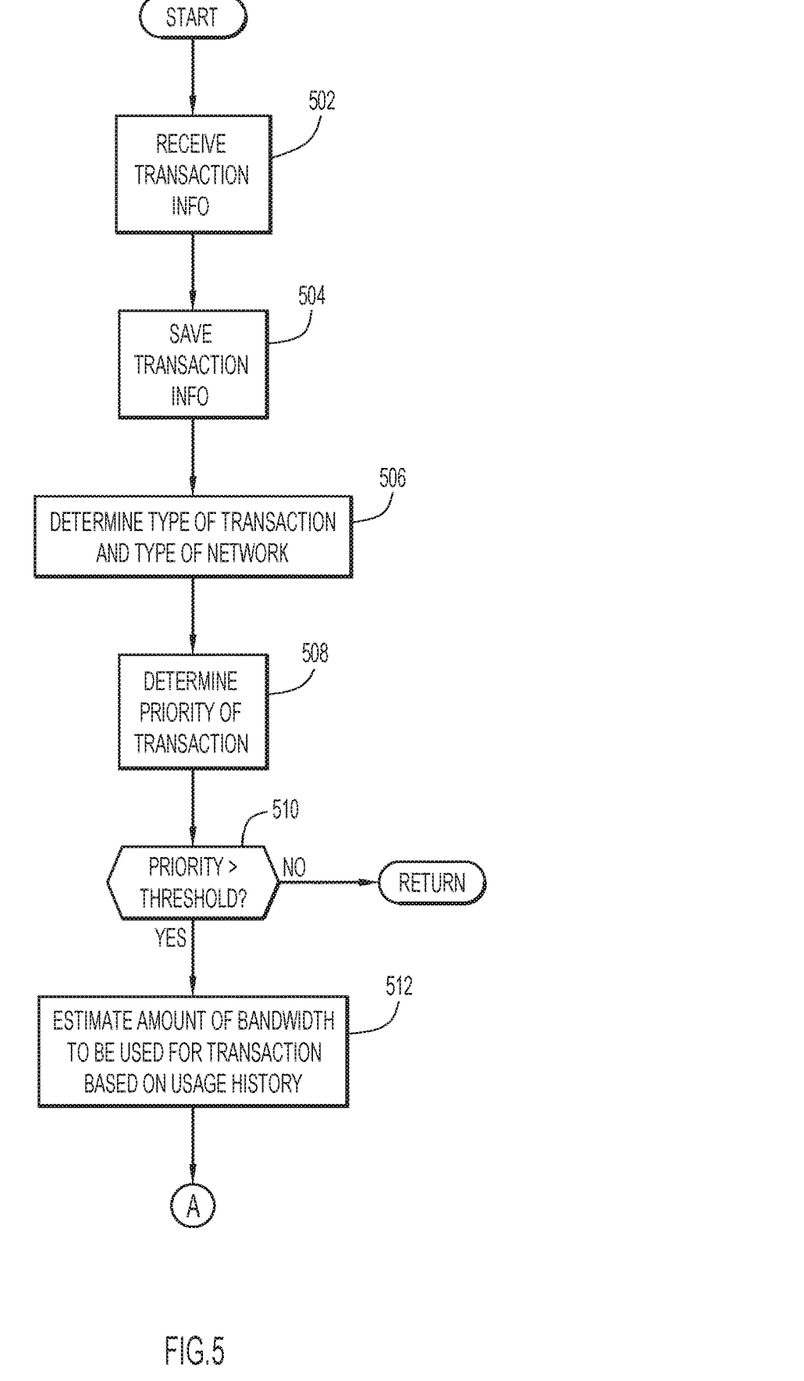
FIGS. 5 and 6 are flowcharts that illustrate an example process, according to the various embodiments, that may be performed by a server to automatically recharge available bandwidth to increase a likelihood that a transaction will successfully complete.

FIG. 5 is a flowchart illustrating an example process that may be performed by server 104 when transaction information is received from computing device 106. The process may begin with server 104 receiving the transaction information (act 502). Server 104 may save the transaction information (act 504) and may determine a type of transaction and a type of network based on the transaction information (act 506). Server 104 may determine the type of transaction based on, for example, a destination network address of the transaction, a NSP account associated with the transaction, a length of information included with the transaction, other information, or any combination of the above. The type of network, in some embodiments, may include, but not be limited to, a professional network and a personal network. Server 104 may be previously trained to classify a network as being personal, professional, or another type of network based on various items of information which may include a destination network address, a NSP account, or other information.

Next, server 104 may determine a priority of the transaction based on the determined type of the transaction, the determined type of the network, or both the determined type of the transaction and the determined type of the network (act 508). If the determined priority is not greater than or equal to a threshold level of priority (act 510), then the process may be completed.

Figure 6:
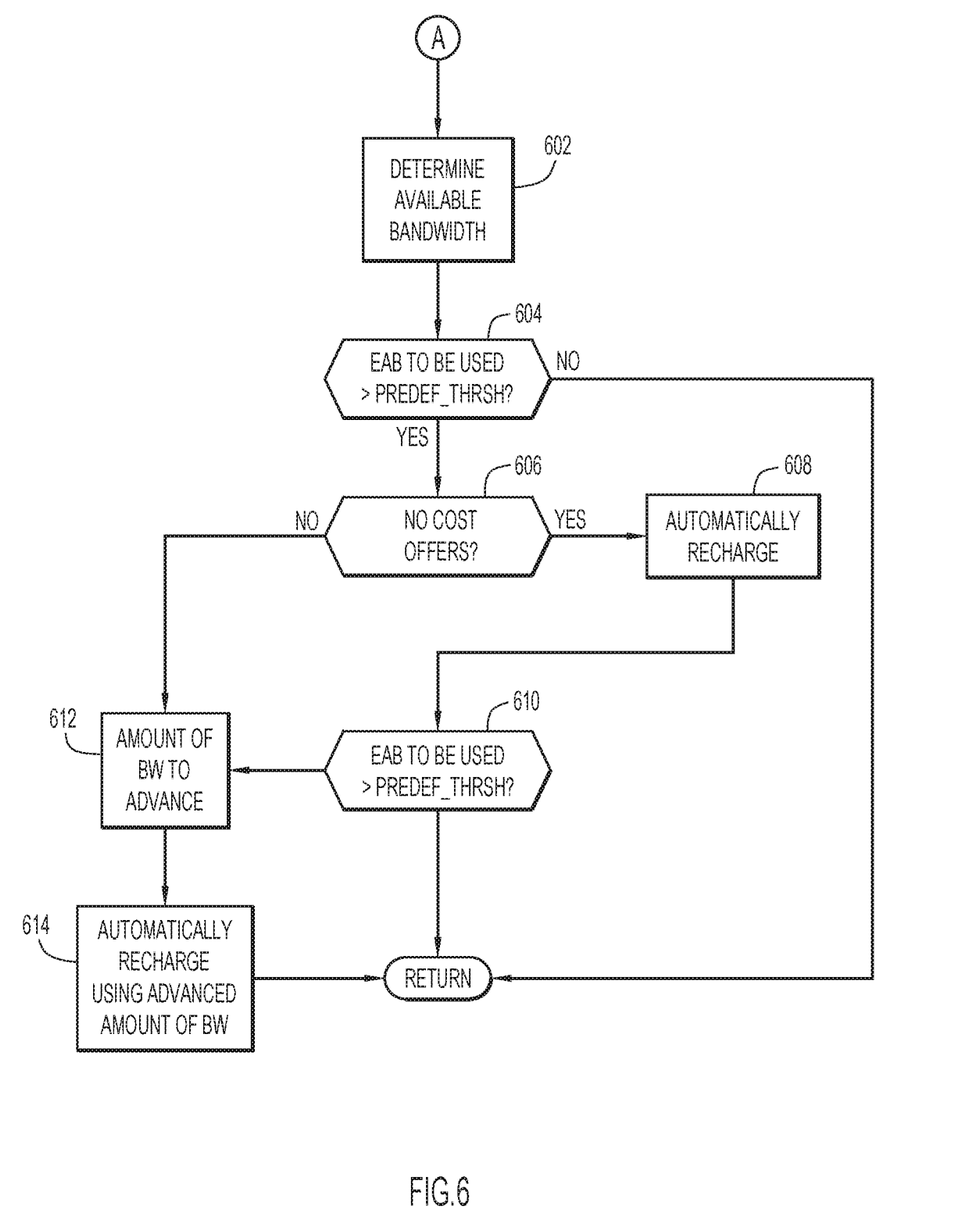

If the determined priority is greater than or equal to the threshold level of priority (act 510), then server 104 may estimate an amount of bandwidth to be used for the transaction based at least on the type of transaction and usage history (act 512). Server 104 may then determine an amount of bandwidth available to the NSP account associated with the transaction (act 602; FIG. 6).

Next, server 104 may determine whether the estimated amount of bandwidth to be used for the transaction is greater than a predefined threshold of the amount of bandwidth available to the NSP account (act 604). If the estimated amount of bandwidth available to the NSP account is not greater than the predefined threshold level of the bandwidth available to the user account, then the process may be completed.

If, during act 604, server 104 determines that the estimated amount of bandwidth to be used is greater than the predefined threshold level of the amount of bandwidth available to the user account, then server 104 may determine whether the user account has any no additional cost offers for additional bandwidth (act 606). In some embodiments, the no additional cost offers may include, but not be limited to, an unused portion of a data quota for the NSP account for one or more previous time periods or billing cycles. Server 104 may then automatically recharge the amount of bandwidth available to the NSP account by, at least temporarily, increasing the data quota for the user account (act 608). In some embodiments, an amount of bandwidth added to the data quota may be either an amount such that the estimated amount of bandwidth to be used would not be greater than the predefined threshold level of the amount of bandwidth available after the automatically recharging, or the amount of bandwidth from the no additional cost offers may be exhausted and the estimated amount of bandwidth to be used may or may not be greater than the predefined threshold level of the amount of available bandwidth.

After automatically recharging the bandwidth, during act 608, server 106 may determine whether the estimated amount of bandwidth to be used remains greater than the predefined threshold of the amount of bandwidth available (act 610). If the estimated amount of bandwidth to be used is determined to be not greater than the predefined threshold of the amount of bandwidth available, then the process is completed.

If, during act 606 a determination is made that additional bandwidth from free offers is not available, or during act 610, the estimated amount of bandwidth to be used is greater than the predefined threshold of the amount of bandwidth available, then server 104 may determine an amount of bandwidth to advance (act 612), which in some embodiments may be just enough bandwidth such that, after recharging using the advanced amount of bandwidth, the estimated amount of bandwidth to be used is not greater than the predefined threshold of bandwidth available. Server 104 may then automatically recharge the bandwidth using the advanced amount of bandwidth (act 614).

In some embodiments, instead of advancing an amount of bandwidth to the NSP account, a user's credit card may be automatically charged for the amount of bandwidth. The user's credit card may have been previously registered with the network service provider for the NSP account.

Figure 7:
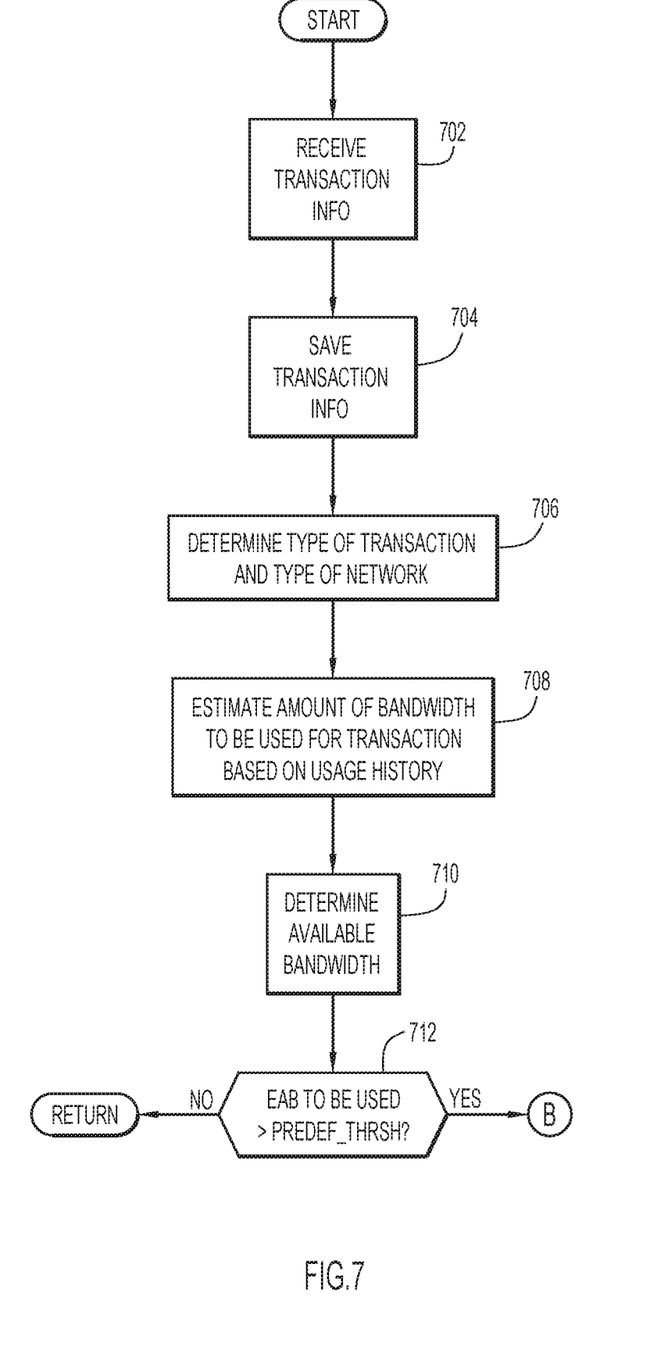
FIGS. 7 and 8 are flowcharts that illustrate an example process, according to an alternate embodiment, that determines actions to perform to increase a likelihood of successful completion of the transaction.
Figure 8:
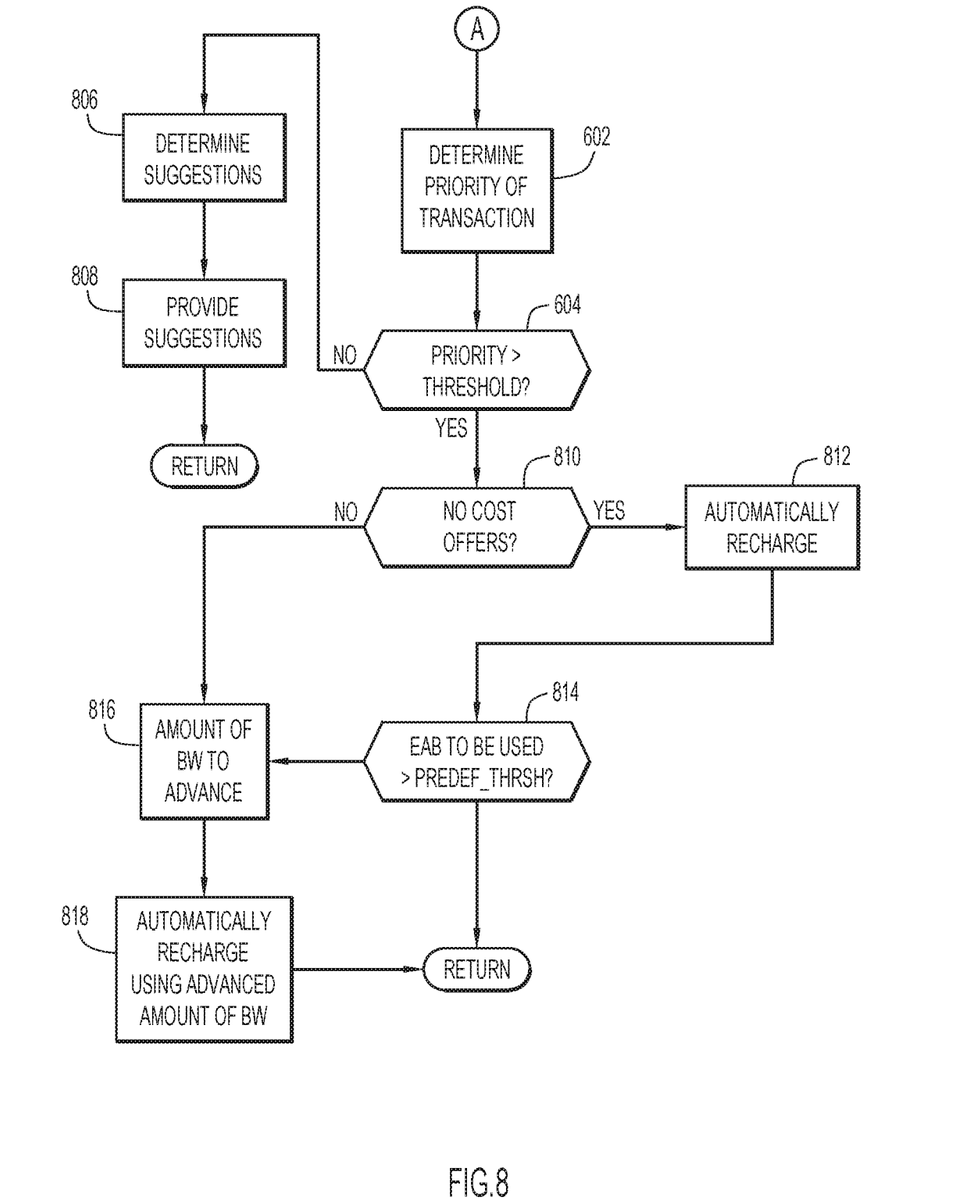

FIGS. 7 and 8 are flowcharts that illustrate an alternate embodiment with respect to FIGS. 5 and 6. In this embodiment, server 104 may receive transaction information from computing device 106 (act 702) and may save the transaction information (act 704). Server 104 may then determine a type of the transaction and a type of the network (act 706). Server 104 may determine the type of transaction based on, for example, a destination network address of the transaction, a NSP account associated with the transaction, a length of information included with the transaction, other information, or any combination of the above. Server 104 may be previously trained to classify a network as being personal, professional, or another type of network based on various items of information which may include the destination network address, the NSP account, or the other information.

Server 104 then may estimate an amount of bandwidth to be used for the transaction based at least on usage history regarding the type of the transaction (act 708). Server 104 may then determine an amount of bandwidth available to the NSP account associated with the transaction (act 710). Server 104 may then determine whether the estimated amount of bandwidth to be used for the transaction is greater than the predefined threshold of the amount of bandwidth available to the user account (act 712).

If the estimated amount of bandwidth to be used for the transaction is not greater than the predefined threshold of the amount of bandwidth available to the NSP account, then the process may be completed. Otherwise, server 104 may determine a priority of the transaction based on the determined type of the transaction, the determined type of the network, or both the determined type of the transaction and the determined type of the network (act 802; FIG. 8). As mentioned above, server 104 may use previously trained classifiers to determine the priority of the transaction.

If the determined priority is not greater than the threshold level of the priority (act 804), then server 104 may determine suggested actions to take to increase a likelihood that the transaction will successfully complete (act 806) and may perform and/or provide the suggested transactions to the user or another entity (act 808). The suggested actions may be based on monitoring respective amounts of time for performing different types of transactions, occupancy of one or more processors of computing device 106, which may be reported to server 104, bandwidth availability, browser capabilities, usage patterns detected in a usage history, network service provider details, a time of day, and a user proficiency level. The suggested actions may include, but not be limited to, performing the transaction at a different time of day or a different day of the week, ceasing other activity that is using bandwidth of the NSP account before attempting to perform the transaction, etc. In some embodiments, the suggested actions may take into consideration a proficiency level of a user associated with the NSP account. For example, if a user has a low level of proficiency, suggested actions for the user would be simple and uncomplicated, such that the user should be capable of carrying out the actions. In some embodiments, server 104 may monitor enterprise data usage for professional transactions on a professional network and may determine one or more actions to take, based on the monitoring, to increase a likelihood of successful completion of professional transactions.

If, during act 804, server 104 determines that the transaction has a priority that is greater than or equal to the threshold level of priority, then server 104 may determine whether the user account has any no additional cost offers for additional bandwidth (act 810). In some embodiments, the no additional cost offers may include, but not be limited to, an unused portion of a data quota for the NSP account from one or more previous time periods or billing cycles. Server 104 may then automatically recharge the amount of bandwidth available to the user account by, at least temporarily, increasing the data quota for the user account (act 812). In some embodiments, an amount of bandwidth added to the data quota may be either an amount such that the estimated amount of bandwidth to be used would not be greater than the predefined threshold level of the amount of bandwidth available after the automatically recharging, or the amount of bandwidth from the no additional cost offers may be exhausted and the estimated amount of bandwidth to be used may or may not be greater than the predefined threshold level of the amount of available bandwidth.

After automatically recharging the bandwidth, during act 812, server 104 may determine whether the estimated amount of bandwidth to be used remains greater than the predefined threshold of the amount of bandwidth available (act 814). If the estimated amount of bandwidth to be used is determined not to be greater than the predefined threshold of the amount of bandwidth available, then the process is completed.

If, during act 810 a determination is made that additional bandwidth from no additional cost offers is not available, or during act 814, the estimated amount of bandwidth to be used is determined to be greater than the predefined threshold of the amount of bandwidth available, then server 104 may determine an amount of bandwidth to advance to the NSP account (act 816), which in some embodiments may be just enough bandwidth such that, after recharging using the loaned amount of bandwidth, the estimated amount of bandwidth to be used would not be greater than the predefined threshold of bandwidth available. Server 104 may then automatically recharge the bandwidth for the NSP account using the advanced amount of bandwidth (act 818).

In some embodiments, instead of advancing an amount of bandwidth to the NSP account, a user's credit card may be automatically charged for the amount of bandwidth. The user's credit card may have been previously registered with the network service provider for the NSP account.

Various embodiments may include classifiers trained to determine a type of transaction such as, for example, a personal transaction or a professional transaction, and a type of computer network such as a personal network or a professional network. In addition, the various embodiments may include a core data engine, an analytical engine, and a cognitive engine, which may execute on server 104.

Figure 9:
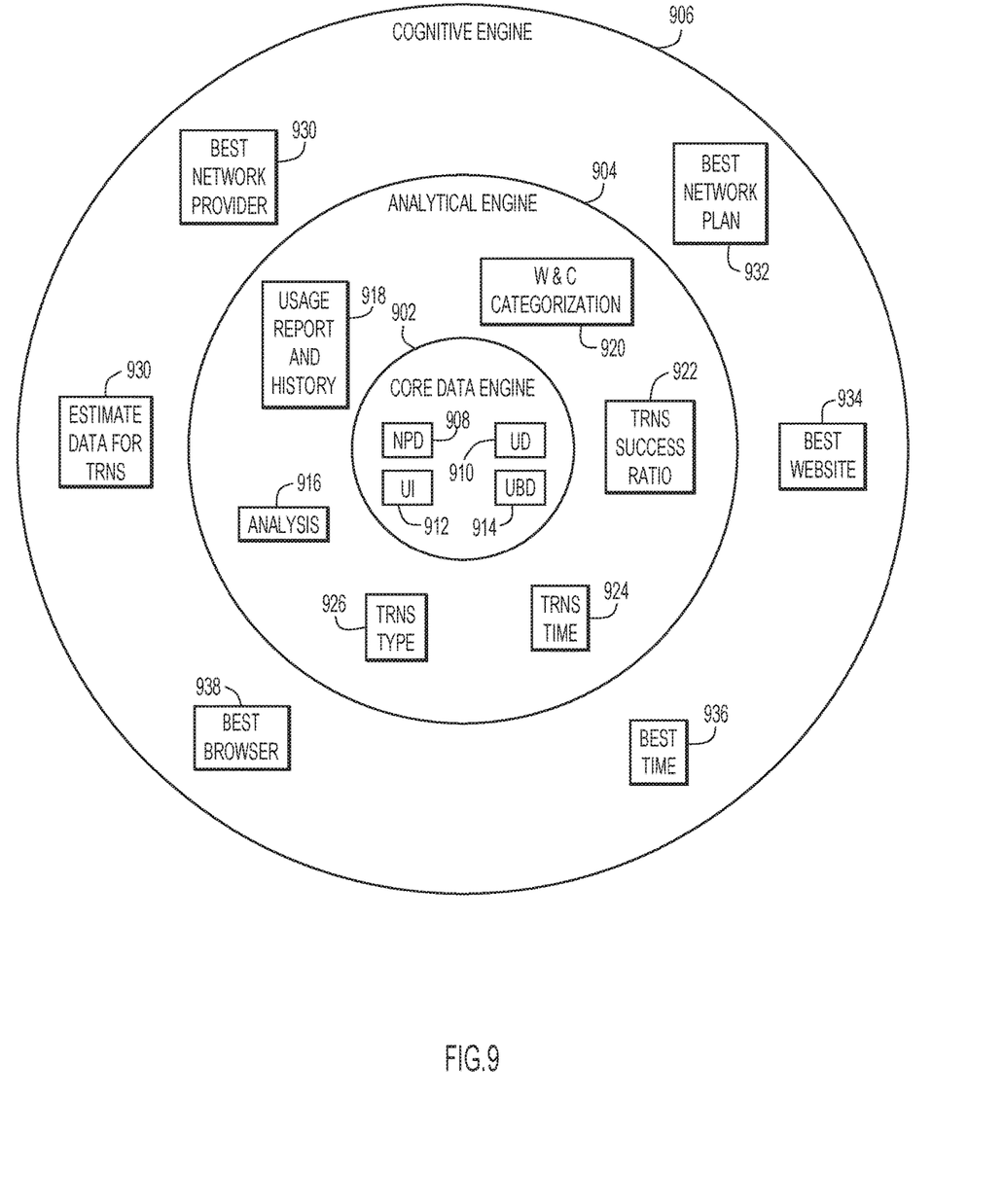
FIG. 9 illustrates example components of a core data engine, an analytical engine, and a cognitive engine that may be implemented in a server according to the various embodiments.

FIG. 9 illustrates an example core data engine 902, analytical engine 904, and cognitive engine 906, which may execute on server 104. Core data engine 902 is responsible for storing and maintaining network server provider details (NPD) 908 for network service providers who provide services to various users, user details (UD) 910 including details regarding NSP accounts including, but not limited to, a data quota and any no additional cost offers for additional bandwidth, user browser details (UBD) 914 regarding types of browsers used for various NSP accounts as well as performance characteristics of various browsers, and usage information (UI) 912 which may be maintained on a NSP account basis. UI 912 may include, but not be limited to, information regarding types of networks used, number of transactions attempted per NSP account, transaction success ratio per user account, etc.

Further, various embodiments may include machine-learning or other classifiers (not shown) previously trained to determine a type of transaction such as, for example, a personal transaction or a professional transaction, and a type of computer network such as a personal network or a professional network.

Analytical engine 904 builds upon the information collected and maintained by core data engine 902. Analytical engine 904 may include, but not be limited to, a number of components such as, for example, an analysis component 916, a transaction type component 926, a transaction time component 924, a transaction success ratio component 922, a website and content categorization component 920, and a usage report and history component 918.

Analysis component 916 is responsible for determining a network speed, an amount of bandwidth available per NSP account, a transaction success rate per NSP account, and an amount of network downtime. Transaction type component 926 keeps track of types of transactions attempted on a per NSP account basis. Transaction time component 924 keeps track of a time at which a transaction was attempted, whether the transaction succeeded or failed, a network destination address of the transaction, and if successfully completed, a time duration regarding performance of the transaction. Transaction success ratio component 922 may keep track of a success ratio of transactions attempted on a per website basis. Website and content categorization component 920 may obtain information regarding websites, their content, and associated payment gateways. Usage report and history component 918 may generate a usage report and usage history on a per NSP account basis using information from the various analytical engine components and core data engine components.

Cognitive engine 906 builds upon information collected and maintained by core data engine 902 and analytical engine 904. Cognitive engine 906 has a number of components including, but not limited to, a component 928 for estimating an amount of data to be used for a transaction, a component 930 for determining a best network provider per NSP account, a component 932 for determining a best network plan for per NSP account, a component 934 for determining best websites for particular types of transactions, a component 936 for determining a best time for performing transactions, and a component 936 for determining a best browser to use for transactions.

The component 928 for estimating an amount of data to be used for a transaction may obtain information from analytical engine 904 and core data engine 902 to estimate an amount of bandwidth to be used for the transaction. The information that the component 928 for estimating the amount of data to be used may include a type of the transaction, a time of the transaction, the usage report and history for the NSP account, as well as other information.

The component 930 for determining a best network service provider may determine the best network service provider for an NSP user account based on the analysis of network components 916, network provider details 908, usage information 912 for the user account, etc.

The component 932 for determining a best network plan for an NSP account may use information such as network provider details 908, user details 910, usage information 912 for the NSP account, the usage report and history 918 for the NSP account, etc., to determine the best network plan for the NSP account.

The best website component 934 may determine a best website and alternate websites for categories of transactions by accessing information such as that produced and maintained by the website and content categorization component 920, the transaction success ratio component 922, the transaction type component 926, the transaction time component 924, as well as other information.

The best time component 936 may determine a best time for performing various transactions by analyzing information from the transaction success ratio component 922, the transaction time component 924, the transaction type component 926, as well as information from other components.

The best browser component 938 may analyze information collected and maintained by the usage report and history component 918, the usage browser details (UBD) component 914, the usage information (UI) component 912, and information from other components to determine a best browser for a NSP account to use.

A combination of components including, but not limited to, the best browser component 938, the best time component, the best website component 934, the best network plan component 932, and the best network provider component 930 may be accessed to determine various actions that may be performed to increase a likelihood that a transaction will successfully complete.

It will be appreciated that the embodiments described above and illustrated in the drawings represent only a few of the many ways of implementing embodiments for automatically recharging a user's network data quota such that a transaction can be successfully completed or actions can be determined for increasing a probability that the transaction can be successfully completed.

The environment of the present invention embodiments may include any number of computer or other processing systems (e.g., client or end-user systems, server systems, etc.) and databases or other repositories arranged in any desired fashion, where the present invention embodiments may be applied to a number of desired types of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for decreasing a failure rate of network transactions, the method comprising:
    monitoring transactions occurring over a computer network on a per network service provider account basis;
    estimating, by at least one processor of a computer system, an amount of bandwidth to be used on a network to complete a transaction from the monitored transactions based on a usage history, wherein the estimated amount of bandwidth to be used exceeds a predefined threshold of an amount of available bandwidth for an account with a network service provider, and wherein the predefined threshold includes a percentage of the amount of available bandwidth for the account that is less than the amount of available bandwidth for the account;
    determining, by the least one processor, a priority of the transaction based on a type of the network and a type of the transaction;
    responsive to determining that the priority of the transaction fails to satisfy a threshold priority level, performing, by the at least one processor, actions to complete the transaction, wherein performing the actions comprises:
        determining a best website based on a transaction success ratio for one or more websites through which transaction completion is at least attempted;
        determining a best network service provider from among a plurality of network service providers;
        determining a best network plan from among a plurality of network plans of the plurality of network service providers;

determining a best user browser based on usage information; and determining the actions based on the best website, the best network service provider, the best network plan, and the best user browser; and responsive to determining that the priority of the transaction satisfies the threshold priority level, performing, by the at least one processor:

automatically recharging the amount of available bandwidth for the account by using one or more offers for additional bandwidth at no additional cost, wherein the one or more offers for additional bandwidth include an unused portion of a data quota for the account for one or more previous time periods;

determining that the estimated amount of bandwidth to be used exceeds the percentage of the amount of available bandwidth for the account with the additional bandwidth of the one or more offers; and automatically recharging the amount of available bandwidth for the account using an amount of bandwidth advanced to the account that enables the estimated amount of bandwidth to be used to not be greater than the percentage of the amount of available bandwidth for the account with the additional bandwidth of the one or more offers and the amount of bandwidth advanced to the account.

2. The method of claim 1, further comprising:

monitoring one or more items from a group of respective amounts of time for performing different types of transactions, occupancy of one or more processors of a computing device, bandwidth availability, browser capabilities, usage patterns, network service providers, a time of day, and a user proficiency level; and responsive to determining that the priority of the transaction fails to satisfy the threshold priority level, performing, by the at least one processor, the actions to complete the transaction with current bandwidth allocated to the account, wherein the actions to complete the transaction are further based on the monitoring of the one or more items.

3. The method of claim 1, further comprising:

determining, by the at least one processor, the type of the network, the type of the network being one of a professional network and a personal network; and determining, by the at least one processor, the type of the transaction, the type of the transaction being one of a professional transaction and a personal transaction.

4. The method of claim 1, further comprising:

monitoring, by the at least one processor, enterprise data usage for professional transactions on a professional network; and determining, by the at least one processor, one or more actions to improve the enterprise data usage based on the monitoring of the enterprise data usage.

5. A system for decreasing a failure rate of network transactions, the system comprising:

at least one processor; and a memory connected to the at least one processor, wherein the at least one processor is configured to perform:

monitoring transactions occurring over a computer network on a per network service provider account basis;

estimating an amount of bandwidth to be used on a network to complete a transaction from the monitored transactions based on a usage history, wherein the estimated amount of bandwidth to be used exceeds a predefined threshold of an amount of available bandwidth for an account with a network service provider, and wherein the predefined threshold includes a percentage of the amount of available bandwidth for the account that is less than the amount of available bandwidth for the account;

determining a priority of the transaction based on a type of the network and a type of the transaction;

responsive to determining that the priority of the transaction fails to satisfy a threshold priority level, performing actions to complete the transaction, wherein performing the actions comprises:

determining a best website based on a transaction success ratio for one or more websites through which transaction completion is at least attempted;

determining a best network service provider from among a plurality of network service providers;

determining a best network plan from among a plurality of network plans of the plurality of network service providers;

determining a best user browser based on usage information; and determining the actions based on the best website, the best network service provider, the best network plan, and the best user browser; and responsive to determining that the priority of the transaction satisfies the threshold priority level, performing:

automatically recharging the amount of available bandwidth for the account by using one or more offers for additional bandwidth at no additional cost, wherein the one or more offers for additional bandwidth include an unused portion of a data quota for the account for one or more previous time periods;

determining that the estimated amount of bandwidth to be used exceeds the percentage of the amount of available bandwidth for the account with the additional bandwidth of the one or more offers; and automatically recharging the amount of available bandwidth for the account using an amount of bandwidth advanced to the account that enables the estimated amount of bandwidth to be used to not be greater than the percentage of the amount of available bandwidth for the account with the additional bandwidth of the one or more offers and the amount of bandwidth advanced to the account.

6. The system of claim 5, wherein the at least one processor is further configured to:

responsive to determining that the priority of the transaction fails to satisfy the threshold priority level, perform the actions to complete the transaction with current bandwidth allocated to the account, wherein the actions to complete the transaction are further based on a level of proficiency of a user.

7. The system of claim 5, wherein the at least one processor is further configured to:

maintain network service provider details, user details, user usage information, and user browser details;

produce a usage report;

maintain the usage history;

track types of transactions and associated times for performing the tracked transactions;

monitor network speed, down time, and bandwidth; and estimate an amount of bandwidth required for at least some of a plurality of transactions based on the usage history.

8. The system of claim 5, wherein the at least one processor is further configured to perform:
- determining the type of the network, the type of the network being one of a professional network and a personal network; and
- determining the type of the transaction, the type of the transaction being one of a professional transaction and a personal transaction.

9. The system of claim 5, wherein the at least one processor is further configured to perform:
- monitoring enterprise data usage for professional transactions on a professional network; and
- determining actions to improve the enterprise data usage based on the monitoring of the enterprise data usage.

10. A computer program product for decreasing a failure rate of network transactions, the computer program product comprising at least one computer readable storage medium having computer readable program code embodied therewith for execution on at least one processor of a computing device, the computer readable program code being configured to be executed by the at least one processor to:
- monitor transactions occurring over a computer network on a per network service provider account basis;
- estimate an amount of bandwidth to be used on a network to complete a transaction from the monitored transactions based on a usage history, wherein the estimated amount of bandwidth to be used exceeds a predefined threshold of an amount of available bandwidth for an account with a network service provider, and wherein the predefined threshold includes a percentage of the amount of available bandwidth for the account that is less than the amount of available bandwidth for the account;
- determine a priority of the transaction based on a type of the network and a type of the transaction;
- responsive to determining that the priority of the transaction fails to satisfy a threshold priority level, perform actions to complete the transaction, wherein performing the actions comprises:
  - determining a best website based on a transaction success ratio for one or more websites through which transaction completion is at least attempted;
  - determining a best network service provider from among a plurality of network service providers;
  - determining a best network plan from among a plurality of network plans of the plurality of network service providers;
  - determining a best user browser based on usage information; and
  - determining the actions based on the best website, the best network service provider, the best network plan, and the best user browser; and
- responsive to determining that the priority of the transaction satisfies the threshold priority level:
  - automatically recharge the amount of available bandwidth for the account by using one or more offers for additional bandwidth at no additional cost, wherein the one or more offers for additional bandwidth include an unused portion of a data quota for the account for one or more previous time periods;
  - determine that the estimated amount of bandwidth to be used exceeds the percentage of the amount of available bandwidth for the account with the additional bandwidth of the one or more offers; and
  - automatically recharge the amount of available bandwidth for the account using an amount of bandwidth advanced to the account that enables the estimated amount of bandwidth to be used to not be greater than the percentage of the amount of available bandwidth for the account with the additional bandwidth of the one or more offers and the amount of bandwidth advanced to the account.

11. The computer program product of claim 10, wherein the computer readable program code is further configured to be executed by the at least one processor to:
- monitor one or more items from a group of respective amounts of time for performing different types of transactions, occupancy of one or more processors of a computing device, bandwidth availability, browser capabilities, usage patterns, and network service providers; and
- responsive to determining that the priority of the transaction fails to satisfy the threshold priority level, perform the actions to complete the transaction with current bandwidth allocated to the account, wherein the actions to complete the transaction are further based on the monitoring of the one or more items.

12. The computer program product of claim 10, wherein the computer readable program code is further configured to be executed by the at least one processor to:
- monitor enterprise data usage for professional transactions on a professional network; and
- determine, based on the monitoring of the enterprise data usage, actions to take to decrease the failure rate of the network transactions.

* * * * *